Figures 1, 2:
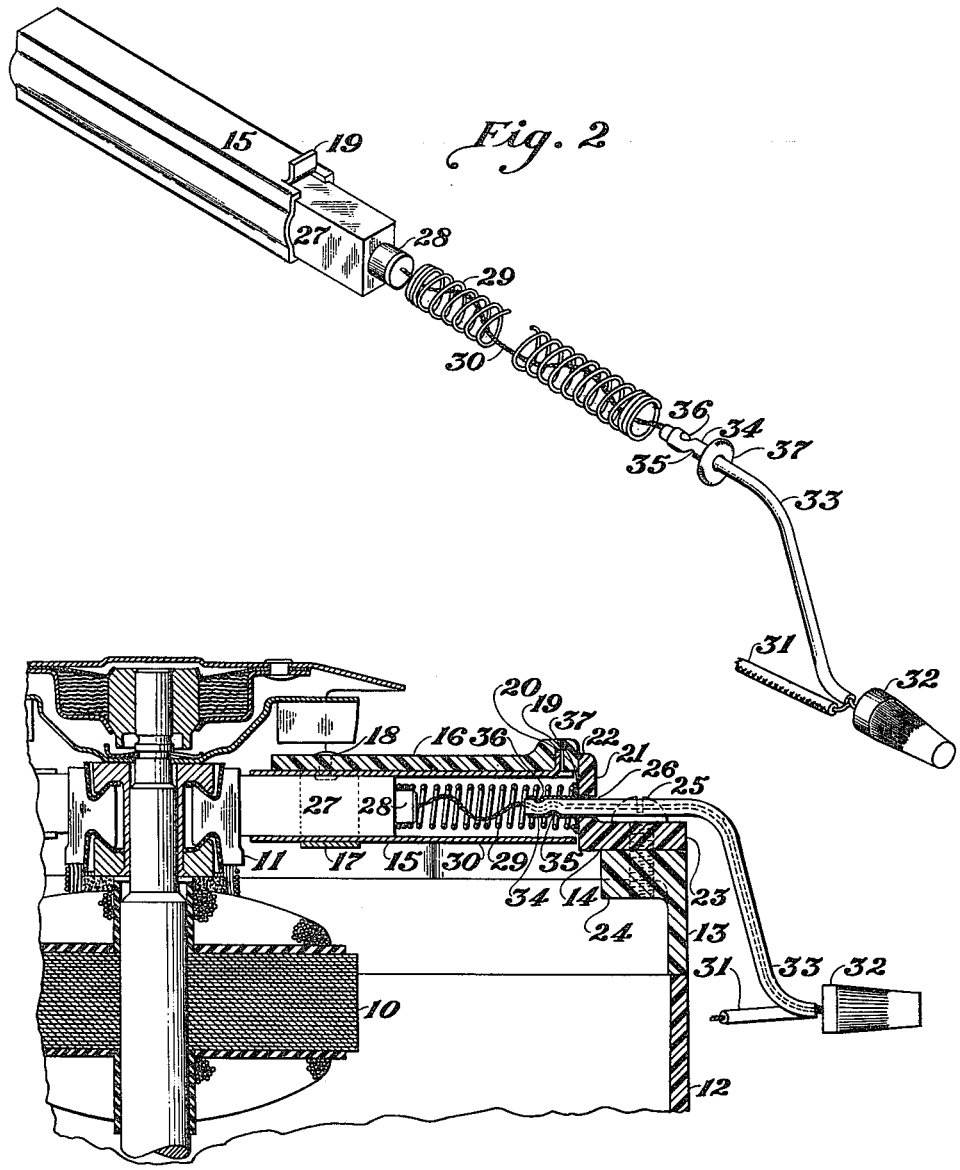

May 5, 1953 W. A. HUMPHREY 2,637,826
MOTOR
Filed Oct. 9, 1951

INVENTOR.
Warren A. Humphrey
BY
Harry S. Dumarr
ATTORNEY.

Patented May 5, 1953

2,637,826

UNITED STATES PATENT OFFICE 2,637,826

MOTOR

Warren A. Humphrey, Canton, Ohio, assignor to The Hoover Company, North Canton, Ohio, a corporation of Ohio Application October 9, 1951, Serial No. 250,508

4 Claims. (Cl. 310—247)

This invention relates to motors and more particularly to the manner in which the commutator brushes are connected to the lead wires.

Prior to the present invention it was the usual practice to extend the lead wires into the commutator brush holder and connect it to a pigtail which in turn was connected to the end of the commutator brush. This required a separate soldered connection between the lead wire and the pigtail. Each time the commutator brush was replaced the soldered connection had to be remade.

According to the present invention the pigtail is extended out of the outer end of the commutator brush holder proper and outside of the motor casing proper and is connected to the lead wire by a solderless connector. An insulating sleeve is slipped over the extended end of the pigtail and extends into the commutator brush holder where its inner end is secured to the pigtail by an eyelet crimped from opposite sides so as to distort both the sleeve and the pigtail to securely attach the sleeve to the pigtail. An opening is formed in the motor casing proper opposite the open end of the brush holder whereby the brush assembly can be easily inserted and removed. The opening is closed by a readily detachable insulating closure which rests against a flange on the outer end of the crimped eyelet to hold the brush spring under the proper tension.

When it is desired to replace a worn brush it is only necessary to release the solderless connector, to remove the insulating closure and pull the brush, brush spring and pigtail from the brush holder and replace them with a new assembly.

Other objects and advantages of the present invention will become apparent as the description proceeds when taken in connection with the accompanying drawings in which:

Figure 1 is a cross-sectional view of a motor showing how the present invention is applied thereto; and Figure 2 is a perspective view of the brush and brush holder assembly of the present invention.

Referring to Fig. 1 the rotor 10 is of conventional construction and includes a commutator 11. The motor proper is housed within an insulating housing including a main section 12 and a detachable end cap 13. The end 13 is cut away at 14 to form openings in alignment with the commutator 11. A metallic brush holder 15 is secured to the top 16 of the end cap 13 by means of a U-shaped strap 17 secured to the top 16 by means of rivets, one of which is shown at 18. Near its outer end the metal on the brush holder 15 is struck outwardly at 19 to form a lug which enters a recess 20 formed in the top wall 16. The lug 19 cooperates with the recess 20 to prevent endwise movement of the brush holder 15.

The opening 14 is closed by an insulating angle shaped closure 21 having a vertically extending leg 22 and a horizontally extending leg 23. The leg 23 is secured to an inwardly extending lug 24 on the end cap 13 by means of a screw 25. The leg 22 is provided with an opening 26 in line with the open end of the brush holder 15.

The brush 27 has a cylindrical outer end portion 28 over which is placed the inner end of the coiled compression spring 29. Suitably attached to the cylindrical portion 28 of brush 27 is a pigtail conducting wire 30. The pigtail 30 extends through the opening 26 and is made long enough to be attached to the lead wire 31 by a solderless connector 32 of known construction. An insulating sleeve 33 surrounds the pigtail 30 and extends from adjacent the solderless connector 32 through the opening 26 and into the open end of the brush holder 15. At its inner end the sleeve 33 is secured to the pigtail 30 by an eyelet 34 crimped from opposite sides at 35 and 36 so as to deform both the sleeve 33 and the pigtail 30 in opposite directions as shown in Fig. 1. The eyelet 34 has a flange 37 cupped inwardly to receive the outer end of the spring 29 and having its outer face resting against the leg 22 of the closure 21.

In assembling the device the brush holder 15 is attached to the top wall 16 of the end cap 13 by the strap 17 so as to be permanently assembled therewith. The assembly shown in Fig. 2 except for the brush holder 15 is then slid through the opening 14 into the open end of the holder 15. The sleeved end of the pigtail 30 is then threaded through the opening 26 of the closure 21 so that the leg 22 abuts against the flange 37 of the eyelet 34. The closure 21 is then pushed inwardly to compress the spring 29 and close the opening 14. The closure 21 may then be secured in place by means of a screw 25. The free end of the pigtail 30 is then connected to the lead wire 31 by means of the solderless connector 32 in a manner well known in the art.

The brush 27 and pigtail 30 with the insulating sleeve 33 secured thereto by means of the eyelet 34 and with the spring 29 surrounding the pigtail between the flange 37 and the brush 27 may be supplied to the servicemen as a unit. When a brush becomes worn it is only necessary to remove the solderless connector 32 and the closure, remove the old brush assembly and replace it with a new one as above described. If desired, the insulating sleeve 33 and the eyelet 34 may be attached by the serviceman so that the old spring may be reused.

From the foregoing it can be seen that according to the present invention a simple and easily replaceable commutator brush assembly is provided which does not require the removal and resoldering of soldered connections in replacing the assembly.

While I have shown but a single embodiment of my invention it is to be understood that that embodiment is to be taken as illustrative only and not in a limiting sense. I do not wish to be limited to the specific structure shown and described but wish to include all equivalent variations thereof except as limited by the scope of the claims.

I claim:

1. A commutator brush assembly comprising, a commutator brush proper, a pigtail conductor secured to one end thereof, an insulating sleeve extending from adjacent the free end of said pigtail inwardly toward said brush to a point removed from said brush so as to leave a portion of said pigtail uninsulated between said sleeve and brush and an eyelet surrounding the inner end of said sleeve, said eyelet being crimped inwardly from its opposite sides to deform said sleeve and pigtail in opposite directions to thereby secure said sleeve to said pigtail.

2. A commutator brush assembly according to claim 1 in which said eyelet is provided with a cupped flange on one end thereof forming an abutment for the outer end of a commutator brush spring.

3. A commutator brush assembly according to claim 2 including a compression spring surrounding said pigtail between said flange and brush.

4. In a motor, an insulating casing, an end cap therefor, a commutator brush holder secured to the end wall of said end cap, said end cap being formed with an opening adjacent the free end of said brush holder, a commutator brush in said brush holder, a pigtail conductor extending from the outer end of said brush and passing through said opening, an insulating sleeve surrounding said pigtail and extending from adjacent the free end thereof into the open end of said brush holder, an eyelet surrounding the inner end of said sleeve and being crimped from opposite sides to deform both said sleeve and pigtail and thereby secure said sleeve to said pigtail, a flange on the outer end of said eyelet, a compression spring extending between said brush and the inner side of said flange and a removable closure for the opening in said end cap and abutting against the outer end of said flange to hold said spring under compression.

WARREN A. HUMPHREY.

References Cited in the file of this patent

UNITED STATES PATENTS

| Number | Name | Date |
|---|---|---|
| 1,874,000 | Ehrlich | Aug. 30, 1932 |
| 2,276,571 | Grypma | Mar. 17, 1942 |
| 2,311,427 | Winkelmeyer | Feb. 16, 1943 |

FOREIGN PATENTS

| Number | Country | Date |
|---|---|---|
| 860,518 | France | Sept. 30, 1940 |